United States Patent [19]

Das et al.

[11] Patent Number: 4,529,665
[45] Date of Patent: Jul. 16, 1985

[54] AMMONIUM SALTS OF SULFOCARBOXYLIC ACID ESTERS AS ACID CATALYSTS

[75] Inventors: Suryya K. Das, Pittsburgh; Samuel Porter, Jr., Natrona Heights; William P. Blackburn, Evans City; Karl F. Schimmel, Verona; Rostyslaw Dowbenko, Gibsonia, all of Pa.

[73] Assignee: PPG Industries, Inc., Pittsburgh, Pa.

[21] Appl. No.: 565,249

[22] Filed: Dec. 23, 1983

[51] Int. Cl.$^3$ ............................................. B32B 15/08
[52] U.S. Cl. .................... 428/460; 428/461; 428/500; 428/524; 525/134; 525/162; 525/406; 525/442; 525/443; 525/456
[58] Field of Search ............... 525/162, 134, 406, 442, 525/443, 456; 428/460, 461

[56] References Cited

U.S. PATENT DOCUMENTS 4,169,825  10/1979  Yapp et al. .......................... 260/31.6
4,243,705   1/1981  Yapp et al. ............................ 427/386
4,294,738  10/1981  Beresniewicz ........................ 260/29.4

OTHER PUBLICATIONS

Technical Bulletin 212H entitled *Monawet Surfactants*, Mar. 1980, by Mona Industries, Inc., P.O. Box 425, 76 E. 24th St., Patterson, NJ, 07544, pp. 2 to 11.
Technical Bulletin entitled *Cyanamid Surfactants, Surface Active Agents for Every Application*, by American Cyanamid Co., Wayne, NJ, 07470, pp. 1 to 3.

*Primary Examiner*—Theodore E. Pertilla
*Attorney, Agent, or Firm*—Linda Pingitore

[57] ABSTRACT

In a curable composition which contains as its principal components an active hydrogen-containing resin, a curing agent, and an acid catalyst, improved properties result by utilizing as the acid catalyst an ammonium salt or substituted ammonium salt of a sulfocarboxylic acid ester. The resultant composition is capable of curing at a low temperature and exhibits good appearance, solvent resistance and intercoat adhesion.

10 Claims, No Drawings

AMMONIUM SALTS OF SULFOCARBOXYLIC ACID ESTERS AS ACID CATALYSTS

BACKGROUND OF THE INVENTION

The present invention is directed to the use of salts of sulfocarboxylic acid esters as catalysts.

The sodium salts of sulfocarboxylic acid esters are well known and have been used frequently in coatings applications. Perhaps best known is their use as surfactants and to this end, a multitude of materials are commericially available. However, these materials are becoming increasingly diversified and other applications are common. For example, U.S. 4,169,825 to Yapp et al is directed to a high solids polyester-containing coating composition which utilizes a sodium sulfated dioctyl succinate as a curing catalyst. These compositions are cured by heating at high temperatures, i.e., up to about 400° F. U.S. Pat. No. 4,294,738 is directed to water-based coating compositions prepared from low molecular weight addition copolymers of polar vinyl monomers. These compositions contain sodium di-2-ethylhexylsulfosuccinate as a miscibilizing agent. The presence in coating compositions of these sodium salts is not without attendant disadvantages. For example, when utilized as curing catalysts, these materials do not cure as well at lower temperatures. This is readily demonstrated by evaluating hardness and solvent resistance of the cured films. Moreover, the appearance of films containing such sodium salts is often unsatisfactory when a high gloss is desired. Since the sodium salts are generally not very soluble in the composition, they tend to migrate and concentrate at the film surface thereby dulling the appearance. Therefore, a sulfocarboxylic acid ester curing catalyst is desired which not only cures well at low temperatures but which also results in a good film appearance and properties.

SUMMARY OF THE INVENTION

In accordance with the present invention there is provided an improved curable composition comprising an active hydrogen-containing resin, a curing agent, and an acid catalyst, wherein the improvement comprises using as the acid catalyst an ammonium salt or substituted ammonium salt of a sulfocarboxylic acid ester in an amount sufficient to provide catalytic activity. Also provided is a coated article comprising a substrate and as a coating thereon a cured composition of the present invention.

DETAILED DESCRIPTION OF THE INVENTION

The curable compositions of the present invention comprise as the improvement the use as acid catalyst of an ammonium salt or sustituted ammonium salt of a sulfocarboxylic acid ester in an amount sufficient to provide catalytic activity.

The ammonium or substituted ammonium salt of a sulfocarboxylic acid ester of the present invention can be represented by the following structural formula:

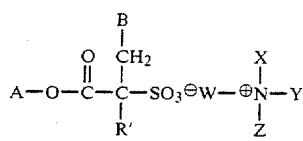

In the above formula A can be a $C_1$ to $C_{20}$ alkyl radical, preferably $C_1$ to $C_{15}$, a $C_3$ to $C_{20}$ cycloalkyl radical, preferably $C_3$ to $C_{10}$, or a $C_6$ to $C_{18}$ aryl radical. Examples of suitable alkyl radicals include butyl, isobutyl, amyl, hexyl, octyl, tridecyl, isodecyl and 2-ethylhexyl. Examples of suitable cycloalkyl and aryl radicals include cyclopentyl, cyclohexyl, cycloheptyl, and phenyl. Preferably A is hexyl, tridecyl, isodecyl or cyclohexyl. R' in the above formula can be hydrogen, a $C_1$ to $C_{20}$ alkyl radical, preferably $C_1$ to $C_{15}$, or a $C_3$ to $C_{20}$ cycloalkyl radical, preferably $C_3$ to $C_{10}$. The examples of alkyl and cycloalkyl substituents enumerated with respect to A are also exemplary of R'.

B in the above formula can be hydrogen or a COOR group wherein R can be a $C_1$ to $C_{20}$ alkyl radical, preferably $C_1$ to $C_{10}$, or a $C_3$ to $C_{20}$ cycloalkyl radical, preferably $C_3$ to $C_{10}$. The examples of alkyl and cycloalkyl substituents enumerated above with respect to A and R' are also exemplary of R.

W, X, Y, Z in the above formula can be independently selected from hydrogen or a $C_1$ to $C_{20}$ alkyl radical, preferably $C_1$ to $C_{10}$. X and Y in the above formula can also join together to form a cycloalkyl group or cycloalkyl group interrupted by a heteroatom. The alkyl substituents which have been enumerated above are also exemplary of W, X, Y, Z. Although it is preferred that W, X, Y, Z are all hydrogen, i.e., the ammonium salt; other salts, i.e., substituted ammonium salts, are also useful such as triethylammonium, dimethylethanol ammonium, diisopropanol ammonium, N-methyl-and N-ethyl-piperidonium, and N-methyl- and N-ethyl-morpholonium.

It should be understood that the aforedescribed alkyl. cycloalkyl and aryl substituents can also be substituted with a variety of substituents so long as they do not detract from the properties of the ammonium or substituted ammonium salt of sulfocarboxylic acid ester catalyst.

The claimed catalysts encompass ammonium or substituted ammonium salts of esters of sulfated monocarboxylic acids as well as ammonium or substituted ammonium salts of esters of sulfated dicarboxylic acids. In one preferred embodiment the latter materials can be represented by the following structural formula:

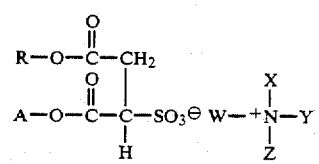

wherein A, R, and W, X, Y, Z are as defined above. The aforesaid preferred materials are termed ammonium or substituted ammonium sulfosuccinates. In the above formula, preferably, W, X, Y, Z are all hydrogen and A and R are together selected from isobutyl, amyl, hexyl, octyl, tridecyl, 2-ethylhexyl or cyclohexyl, more preferably, hexyl or tridecyl, i.e., ammonium bis(tridecyl) sulfosuccinate and ammonium bis(hexyl) sulfosuccinate. Exemplary of the aforementioned monocarboxylic acid ester materials is ammonium isodecyl sulfopropionate.

The claimed ammonium salts of sulfocarboxylic acid esters have not heretofore been known for use as catalysts. They have been known previously as surfactants and they can in some instances be obtained commercially such as, for example, from American Cyanamid or Mona Industries, Inc. under the trademark designations TR-AM and MONAWET MA-80, respectively. Although their commercial availability can be somewhat limited, they can be readily synthesized from an ethylenically unsaturated carboxylic acid anhydride, an alcohol, and ammonium bisulfite. For example, ammonium bis(tridecyl)sulfosuccinate can be prepared from the two-stage reaction of maleic anhydride with tridecyl alcohol followed by the addition of ammonium bisulfite across the maleic double bond. In another preferred embodiment an ammonium monoester such as, for example, ammonium isodecyl sulfopropionate, can be prepared by the addition of ammonium bisulfite across the double bond of an ethylenically unsaturated monomer, e.g., isodecyl acrylate.

In addition to the claimed catalysts described, above, in detail the curable compositions of the present invention also comprise an active hydrogen-containing resin and a curing agent. The active hydrogen-containing resin is preferably a polymeric polyol having an acid value typically within the range of from 0 to 45 and a hydroxyl number typically ranging from about 30 to 300. Examples of useful polymeric polyols include polyester polyols, polyether polyols, acrylic polyols, and polyurethane polyols. These polyols are described in detail in U.S. Pat. No. 4,154,891, column 3, lines 25 to 68, column 4, lines 1 to 68, column 5, lines 1 to 68, and column 6, lines 1 to 2 which disclosure is incorporated by reference herein.

The aforedescribed polyols require a crosslinking agent or curing agent to cure to a durable film. Examples of suitable curing agents include aminoplast resins and phenoplast resins, with the aminoplast resins being preferred. The aforesaid curing agents are described in detail in U.S. 3,919,351, column 5, lines 34 to 68 and column 6, lines 1 to 32 which disclosure is incorporated by reference herein. The curing agent is typically present in the curable composition in an amount of from about 20 percent to about 60 percent by weight based upon the total weight of the resinous components of the composition.

The catalysts of the claimed invention are utilized in an amount sufficient to provide catalytic activity; that is, an amount sufficient to accelerate the cure of the composition to a commercially acceptable rate. Typically, the catalyst is present in an amount ranging from about 0.5 percent to about 5 percent by weight based on the total weight of the resinous components of the composition. If desired, other conventional acid catalysts can be utilized in conjunction with the claimed catalysts, for example, dinonylnaphthalene disulfonic acid. The co-catalyst, if present, can be utilized in varying amounts, usually less than 5 percent by weight based upon the resinous components of the composition.

In addition to the aforedescribed components, the curable compositions of the present invention ordinarily contain other optional ingredients such as pigments, fillers, plasticizers, flow control agents and other formulating additives. The compositions are typically contained in a solvent which can be any solvent or solvent mixture in which the materials employed are compatible and soluble to the desired extent. For example, suitable solvents include methyl amyl ketone, xylene, toluene, methyl ethyl ketone, methyl isobutyl ketone, ethylene glycol monoethyl ether, and ethylene glycol monobutyl ether.

The curable compositions of the present invention can be cured thermally, where upon heating, the liberation of the free acid catalyst occurs. The temperature utilized for cure of the claimed compositions varies widely depending upon the particular catalyst and resin system chosen. Typically temperatures between about 80° C. and about 200° C. are utilized, preferably between about 100° C. and 150° C. The length of time for cure can also vary widely, however, from about 10 to 45 minutes is typical.

The catalysts of the present invention are preferably utilized in coating compositions although they are also useful in other curable compositions such as molding or laminating compositions. As coating compositions, the curable compositions of the present invention can be applied in any conventional manner including brushing, flow coating, spraying, and the like. They are preferably intended for application on metallic substrates such as steel or aluminum, primed or unprimed, although they can be readily applied over any substrate. In one embodiment, the present invention is directed to such coated articles.

The catalysts of the present invention contribute to producing curable compositions which can cure at low temperatures and are package stable and which result in cured films which exhibit good hardness, solvent resistance, appearance, and excellent intercoat adhesion. In addition the cured films have been observed to exhibit good gloss and humidity resistance.

Although the invention has been described with specific references and specific details of embodiment thereof, it is to be understood that it is not intended to be so limited since changes and alterations therein may be made by those skilled in the art which are within the full intended scope of this invention as defined by the appended claims.

EXAMPLE

This example demonstrates that the ammonium salts of sulfocarboxylic acid esters are superior catalysts for curing at low temperatures when compared to sodium salts.

A base coating composition having a resin solids content of 60 percent was prepared from the following ingredients:

| Ingredients | Parts by Weight | Percent Resin Solids |
| --- | --- | --- |
| Acrylic resin[1] | 331 | 70 |
| Aminoplast curing agent[2] | 105 | 30 |
| Methyl amyl ketone | 147 | |

[1]This acrylic resin is commercially available from Rohm and Haas Co. as ACRYLOID AT-400. It has a 74 percent resin solids content in methyl amyl ketone and a hydroxyl number of 67.
[2]A melamine-formaldehyde resin commercially available from Amercican Cyanamid Co. as CYMEL 303.

From the aforesaid base coating composition the following catalyst-containing compositions were prepared. Each composition was spray applied to a cold rolled steel panel treated with Bonderite 40 (treated panels are available from Hooker Chemical Co.) at a film thickness of 2.5 mils. The coated panels were baked at 250° F. (121° C.) for 30 minutes and evaluated as set out below.

| Composition | Catalyst | Parts by Weight of Catalyst | Parts by Weight Base Composition | Pencil Hardness | Solvent Resistance |
|---|---|---|---|---|---|
| A | Sodium salt of bis(tridecyl) sulfosuccinate[3] | 0.86 | 166.7 | 6B | poor |
| B | Ammonium salt of bis(tridecyl) sulfosuccinate[4] | 0.86 | 166.7 | B | good |
| C | Ammonium salt of bis(hexyl) sulfosuccinate[5] | 0.75 | 166.7 | HB | good |
| D | Ammonium salt of isodecyl sulfopropionate[6] | 0.73 | 166.7 | HB | good |

[3]This sodium salt is commercially available from American Cyanamid Co. as AEROSOL TR-70.
[4]This ammonium salt is also commercially available from American Cyanamid Co. as TR-AM.
[5]This ammonium salt is commercially available from Mona Industries, Inc. as MONAWET MA-80.
[6]This ammonium salt was prepared in the following manner:
A reactor vessel equipped with thermometer, stirrer, nitrogen inlet tube, and addition funnel was charged with 100 parts by weight of isodecyl acrylate and 150 parts by weight of isopropyl alcohol. This mixture was heated to a temperature of 90° C. followed by the addition over a two hour period of a mixture of 104 parts by weight of ammonium bisulfite (45 percent solution) and 54 parts by weight of isopropyl alcohol. This reaction mixture was then held for three hours at a temperature of 90° C. The resultant ammonium isodecyl sulfopropionate had an acid value of 141.7.

Pencil Hardness was a measure of the resistance of the coating to a pencil indentor. The hardness scale is as follows beginning with 6B which indicates a relatively soft coating and increasing to 10H which indicates a relatively hard coating: 6B, 4B, 3B, 2B, B, HB, F, H, 2H, 3H . . . up to 10H.

Solvent Resistance was evaluated after each coated panel underwent 20 double rubs with a xylene soaked cloth. A "good" rating indicated that no coating was removed from the panel. A "poor" rating indicated that some coating was removed from the panel.

What is claimed is:

1. A curable composition comprising an active hydrogen-containing resin, a curing agent, and an acid catalyst, wherein the improvement comprises using as the acid catalyst an ammonium salt or substituted ammonium salt of a sulfocarboxylic acid ester in an amount sufficient to provide catalytic activity.

2. The composition of claim 1 wherein the catalyst is represented by the following structural formula:

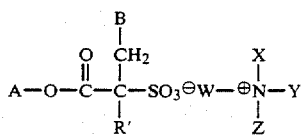

wherein:
A is a $C_1$ to $C_{20}$ alkyl radical, a $C_3$ to $C_{20}$ cycloalkyl radical, or a $C_6$ to $C_{18}$ aryl radical;
B is a hydrogen, or COOR, wherein R is a $C_1$ to $C_{20}$ alkyl radical or $C_3$ to $C_{20}$ cycloalkyl radical;
R' is hydrogen, a $C_1$ to $C_{20}$ alkyl radical or $C_3$ to $C_{20}$ cycloalkyl radical; and
W, X, Y, Z are independently hydrogen, a $C_1$ to $C_{20}$ alkyl radical, or X and Y when joined together form a cycloalkyl group or a cycloalkyl group interrupted by a heteroatom.

3. The composition of claim 2 wherein the catalyst is represented by the following structural formula:

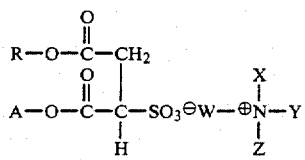

4. The composition of claim 3 wherein W, X, Y, Z are all hydrogen and A and R are together selected from the group consisting of isobutyl, amyl, hexyl, octyl, tridecyl, 2-ethylhexyl, and cyclohexyl.

5. The composition of claim 2 wherein B is hydrogen and R' is hydrogen.

6. The composition of claim 1 wherein the catalyst is ammonium isodecyl sulfopropionate.

7. The composition of claim 1 wherein the catalyst is ammonium bis(tridecyl)sulfosuccinate.

8. The composition of claim 1 wherein the catalyst is ammonium bis(hexyl)sulfosuccinate.

9. The composition of claim 1 wherein the catalyst is present in an amount ranging from about 0.5 percent to about 5 percent by weight based upon the resinous components of the composition.

10. A coated article comprising:
(a) a substrate and as a coating thereon
(b) the cured composition of claim 1.

* * * * *